No. 637,138. Patented Nov. 14, 1899.
E. A. LYNNE.
SNAP HOOK FOR FASTENING REINS.
(Application filed June 25, 1897.)
(No Model.)

Witnesses
C. M. Bradway
Victor J. Evans

Inventor
Elmer A. Lynne
By John Wedderburn
Attorney

UNITED STATES PATENT OFFICE.

ELMER A. LYNNE, OF WESTBROOK, CONNECTICUT.

SNAP-HOOK FOR FASTENING REINS.

SPECIFICATION forming part of Letters Patent No. 637,138, dated November 14, 1899.

Application filed June 25, 1897. Serial No. 642,251. (No model.)

*To all whom it may concern:*

Be it known that I, ELMER A. LYNNE, of Westbrook, in the county of Middlesex and State of Connecticut, have invented certain new and useful Improvements in Snap-Hooks for Fastening Reins; and I do hereby declare the following to be a full, clear, and exact description of the invention, such as will enable others skilled in the art to which it appertains to make and use the same.

This invention relates to snap-hooks.

The object of the invention is to provide a snap-hook coupler which can be easily and quickly operated in cold weather with gloves or mittens.

The invention is especially applicable to the coupling or joining of the ends of driving-reins, where it is important that the reins be easily and quickly connected together.

Figure 1:
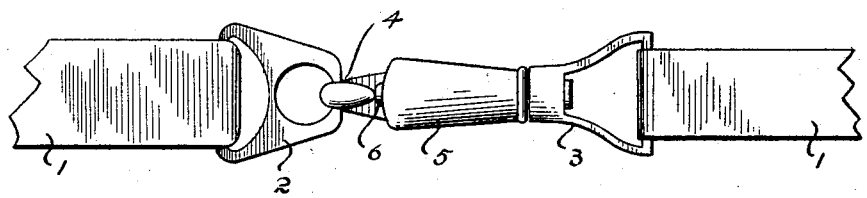
Figure 2:
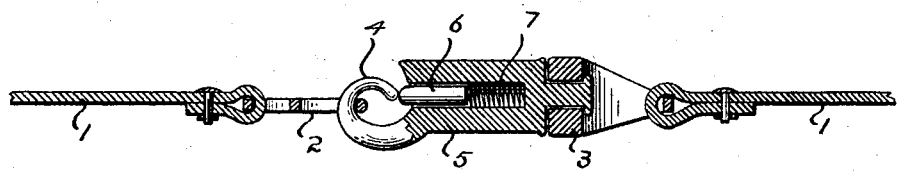
Figure 3:
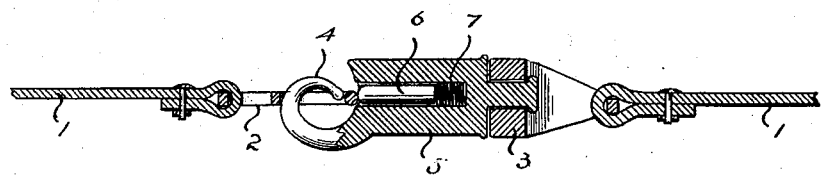

In the drawings forming a part of this specification, Figure 1 is a plan of the invention, showing the flat side of reins with my snap-hook attachment for coupling the same. Fig. 2 is a section at right angles to the plane of Fig. 1, the snap-hook being engaged with an eye. Fig. 3 is also a central section showing the spring-bolt pressed backward in the process of coupling or uncoupling.

1 1 are the extremities or ends of ordinary driving-reins.

2 is a metallic loop or ring connected with one of the ends of a rein.

3 is a loop or finding attached to the end of the other rein.

4 is a hook which is provided with an enlarged shank 5, having a swiveled connection with a loop or finding 3. The large shank is provided with a central or axial recess in line with the point or end of the hook 4, and within the recess is arranged a reciprocating bolt or keeper 6, held in operative position by means of a spring 7. The shank opposite the end of the hook is curved and concaved, as shown in the drawings, to provide a narrow throat through which a loop, as 2, may be readily passed when brought into axial line with the bolt 6.

It will be observed that by reason of the construction of the throat with a curve and a concave the loop or ring can only be inserted and removed when arranged in line with the bolt 6 and the point of the hook.

Having described my invention, what I claim as new, and desire to secure by Letters Patent, is—

A snap-hook having an enlarged tubular shank, a concaved and curved throat or passage leading past the end of the hook, and a spring bolt or keeper arranged in the tubular shank centrally of the concaved curved passage and in line with the end of the hook, substantially as described.

In testimony whereof I have signed this specification in the presence of two subscribing witnesses.

ELMER A. LYNNE.

Witnesses:
JAMES PHELPS,
LYDIA A. PHELPS.